UNITED STATES PATENT OFFICE.

RICHARD WOLFFENSTEIN AND OSKAR BOETERS, OF BERLIN, GERMANY.

PROCESS OF CONCENTRATING NITRIC ACID.

No. 864,217.  Specification of Letters Patent.  Patented Aug. 27, 1907.

Application filed December 17, 1906. Serial No. 348,164.

*To all whom it may concern:*

Be it known that we, RICHARD WOLFFENSTEIN and OSKAR BOETERS, subjects of the German Emperor, residing at Berlin, Germany, have invented a certain new and useful Process of Concentrating Nitric Acid, of which the following is a specification.

At present the concentration of dilute nitric acid is generally effected by means of concentrated sulfuric acid. This method has various drawbacks. In the first place it requires the erection of a sulfuric acid factory and extensive and costly plant for itself and also for the regeneration of the sulfuric acid used for concentration, because the latter volatilizes after having reached certain degrees of concentration. Moreover, the concentrated sulfuric acid has a decomposing effect on the nitric acid. Consequently the process is irrational and complicated. This evil is well-known; attempts have therefore been made to render the concentration of nitric acid possible by other methods, and the patent literature mentions various processes which have this object. According to one of these processes calcium chlorid and magnesium chlorid are to be used for the concentration of nitric acid. The use of these salts, however, entails the evil, that the strong nitric acid sets free also hydrochloric acid from the salts, whereby the nitric acid is rendered impure. For this reason the inventors of such processes have not used the salts in a solid state, but only solutions of the same, whereby they deprived themselves at the start of a large portion of the desired effect.

According to another process anhydrous sodium-sulfate or calcium-sulfate is used, over which substances the nitric acid heated above the boiling point, is conducted. The method of action of these salts, however, is very limited, for Glauber's salt yields up its water of crystallization at temperatures over 33° C., and gypsum loses its water at 110° C., that is to say, at temperatures so low that a rational abstraction of water from dilute nitric acid heated above the boiling point cannot take place. In practice none of these processes seems to have been adopted to any considerable extent, in consequence of which the concentration of nitric acid by means of concentrated sulfuric acid is still most frequently used.

We have ascertained, that the concentration of nitric acid may be effected far more advantageously by means of nitrates capable of entering into chemical combination with water, such as calcium nitrate and magnesium nitrate. The advantage of this process in comparison with that generally used is based on the fact, that it saves the building and working of a sulfuric acid factory, and that the production of nitrous gases, which is liable to take place in the ordinary process through the action of concentrated sulfuric acid, is avoided.

The present process is carried out simply by dehydrating for instance the calcium-nitrate, at 150—200° and after cooling to about 50° C., pouring over it the nitric acid to be concentrated. In consequence of this treatment the nitric acid is deprived of water, when the heating is renewed, and distils over in a concentrated condition, while the calcium nitrate re-absorbs water. If now the temperature is again raised to about 150 to 200° C., the calcium nitrate, remained behind in the retort, yields up water (4 molecules) which it had absorbed, becomes anhydrous and may be used again for the extraction of water.

A special advantage of the application of calcium nitrate is the fact, that this salt swells up and becomes highly porous, thus presenting to the nitric acid solution a large surface.

It is advantageous to carry out the process by making use of the principle of counter currents, that is to say the untreated and therefore weakest nitric acid is first brought together with the nitrate which has absorbed a considerable quantity of water, while the partly treated and therefore stronger nitric acid comes in contact with nitrate which contains less water and is therefore capable of abstracting water from the partly concentrated acid.

As regards the quantity of materials used, we have found, for example, that for concentrating a 63 per cent nitric acid, from 1¼ to 1½ kilograms of calcium nitrate should be used for every kilogram of nitric acid.

What we claim is:—

1. The improvement in the art of concentrating nitric acid, which consists in treating it with an anhydrous nitrate capable of combining chemically with water, substantially as described.

2. The process for concentrating dilute nitric acid, which consists in heating a hydrated nitrate so as to drive out the water, then allowing it to cool, pouring over it the nitric acid to be concentrated, and then distilling off and recovering the nitric acid, substantially as described.

3. The herein described process for concentrating dilute nitric acid, which consists in dehydrating hydrated calcium nitrate by heat, allowing it to cool, adding the nitric acid to be concentrated, and heating the mixture, so as to distil off the nitric acid.

4. The herein described process for concentrating dilute nitric acid, which consists in dehydrating a hydrated nitrate by heat, allowing it to cool, adding the nitric acid to be concentrated, heating the mixture so as to distil off the nitric acid, collecting the same and using the residue of nitrate repeatedly in the same manner.

5. The herein described process for concentrating dilute nitric acid, which consists in dehydrating a hydrated nitrate by heat and *in vacuo*, adding the nitric acid to be concentrated, heating the mixture so as to distil off the nitric acid, collecting the same and using the residue of nitrate repeatedly in the same manner.

In testimony whereof we have set our hands hereunto in the presence of two subscribing witnesses.

RICHARD WOLFFENSTEIN.
OSKAR BOETERS.

Witnesses:
ERICH TETTNER,
ARTHUR MARSUSE.